United States Patent [19]

Greenhalgh et al.

[11] 4,124,355
[45] Nov. 7, 1978

[54] TRANSFER DYEING WITH 1-AMINO-4-ANILINOANTHRAQUINONE DYES

[75] Inventors: Colin W. Greenhalgh; David F. Newton; Richard Budziarek; Howard Clarke, all of Manchester, England

[73] Assignee: Imperial Chemical Industries Limited, London, England

[21] Appl. No.: 887,854

[22] Filed: Mar. 17, 1978

[30] Foreign Application Priority Data

Apr. 25, 1977 [GB] United Kingdom ............... 17131/77

[51] Int. Cl.$^2$ ................................................ D06P 5/00
[52] U.S. Cl. ..................................... 8/2.5 A; 8/2.5 R; 8/39 C; 106/22; 260/377; 260/378; 428/913

[58] Field of Search ................... 8/2.5 R, 2.5 A, 39 C

[56] References Cited

U.S. PATENT DOCUMENTS 3,707,346  12/1972  Markert et al. ...................... 8/2.5 A

*Primary Examiner*—Stanford M. Levin
*Attorney, Agent, or Firm*—Cushman, Darby & Cushman

[57] ABSTRACT

A process for the transfer color printing of synthetic textile materials wherein the dyestuff used is a 1-amino-4-anilinoanthraquinone having one or two ortho substituents in the anilino group. The anthraquinone nucleus may be further substituted in the 2- and/or 3-position, preferably by an electron-withdrawing group in the 2-position.

8 Claims, No Drawings

TRANSFER DYEING WITH 1-AMINO-4-ANILINOANTHRAQUINONE DYES

This invention relates to a process for the coloration of synthetic textile materials and more particularly to a process for the transfer color printing of synthetic textile materials.

In the known process of transfer color printing, a transfer material which has been printed with an ink or inks containing one or more sublimable disperse dyestuffs is placed in contact with a synthetic textile material and the whole is then heated, preferably at a temperature in the region of 160° C. to 220° C., whereby the dyestuff of dyestuffs are transferred from the transfer material to the synthetic textile material. In order that the dyestuffs used in this process transfer satisfactorily in a reasonable time, which is usually within the range of 15 to 60 seconds, it is necessary that the dyestuffs sublime easily and for this purpose it is usual to use water-insoluble dyestuffs of the class which are commonly referred to as Disperse Dyestuffs and which are free from acidic water-solubilising groups such as carboxylic acid and sulphonic acid groups.

In order for a disperse dyestuff to be acceptable for use in a transfer color printing process it must not only have adequate volatility at the transfer temperature, so that transfer can be effected rapidly and before the relatively high temperature can result in damage to the synthetic textile material being printed, but the fastness properties of the print so obtained must also be adequate. It has now been discovered that this desirable combination of properties is in general achieved by the use of the dyestuffs which are employed in present invention as defined below.

According to the present invention there is provided a process for the transfer color printing of synthetic textile materials which comprises placing a transfer material which carries a colored pattern, derived from one or more disperse anthraquinone dyestuffs, in contact with a synthetic textile material and heating the transfer material and the synthetic textile material whilst in contact so as to transfer the dyestuff from the transfer material to the synthetic textile material, the disperse anthraquinone dyestuff or dyestuffs being of the formula:

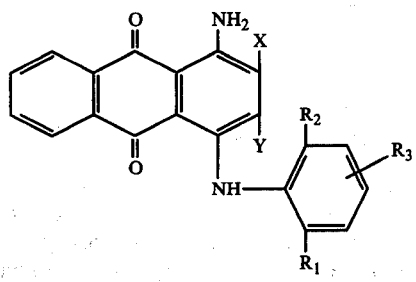

wherein

X and Y are each independently hydrogen, optionally substituted lower alkyl, lower alkoxy, lower alkylmercapto or an electron-withdrawing group;

$R_1$ is optionally-substituted lower alkyl, lower alkoxy, lower alkoxycarbonyl, halogen, nitrile or acyloxy and $R_2$ and $R_3$ are each independently hydrogen, optionally substituted lower alkyl, lower alkoxy, lower alkoxycarbonyl, halogen, nitrile or acyloxy.

By "lower alkyl" and "lower alkoxy" we mean alkyl and alkoxy groups which contain from 1 to 4 carbon atoms.

It is preferred that one at least of X and Y, preferably X, is an electron-withdrawing group, for example, halogen such as chlorine and bromine, nitrile, nitro, aldehyde, lower alkoxycarbonyl such as methoxycarbonyl and ethoxycarbonyl, lower alkylsulphonyl such as methylsulphonyl, lower alkylsulphonylamino such as methylsulphonylamino or lower alkylcarbonyl such as acetyl.

Examples of other groups represented by X, and Y are methyl, ethyl, n-propyl, isopropyl, the isomeric butyls, chloromethyl, methoxy, ethoxy, methylmercapto, ethylmercapto.

Examples of groups represented by $R_1$, $R_2$ and $R_3$ are methyl, ethyl, n-propyl, isopropyl, the isomeric butyls, methoxy, ethoxy, methoxycarbonyl, ethoxycarbonyl, chlorine, bromine.

Dyestuffs having the structure defined above, in which the anilino group carries at least one ortho substituent have superior transfer properties compared with similar dyestuffs in which any substituents on the anilino group are in positions other than ortho.

Disperse anthraquinone dyestuffs have the above structure are obtained in known manner by reaction of an anthraquinone compound of the formula:

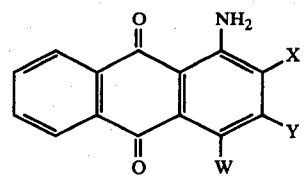

with an arylamine of the formula:

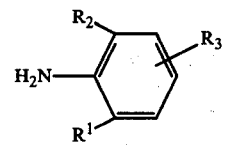

wherein X, Y, $R_1$, $R_2$ and $R_3$ have the meanings defined above and W represents a chlorine or a bromine atom. The reaction is conveniently carried out in an inert solvent and at an elevated temperature.

Thus, 1-amino-4-arylamino- and 1-amino-2-halogeno-4-arylaminoanthraquinones are prepared by the reaction of, for example, 1-amino-4-bromoanthraquinone, 1-amino-2,4-dibromoanthraquinone or 1-amino-2-chloro-4-bromoanthraquinone with the appropriate arylamine, for example, o-toluidine, 2,6-dimethylaniline, 2,4,6-trimethylaniline, o-chloroaniline, 2-chloro-6-methylaniline, o-anisidine or anthranilic acid.

A typical preparation is carried out as follows (all parts are by weight):

A mixture of 1-amino-2,4-dibromoanthraquinone (15.24 parts), o-toluidine (42.8 parts), anhydrous potassium acetate (5.1 parts) and cupric acetate (0.15 part) is stirred at 110°–140° C. until the reaction is complete as shown by thin layer chromatographic analysis after 18-20 hours. The mixture is then cooled to 70°–80° C.

and diluted with methanol (approximately 80 parts) while stirring and cooling to room temperature. The resulting dyestuff is filtered off, washed with methanol, slurried in dilute hydrochloric acid (1 molar solution) re-filtered, washed with water and dried. The yield of 1-amino-2-bromo-4-o-toluidinoanthraquinone is 13.15 parts.

The 1-amino-2,4-dibromoanthraquinone used in the above preparation may be replaced by a 1-amino-4-bromoanthraquinone having a different substituent in the 2-position, for example, methyl, ethyl, methoxycarbonyl, ethoxycarbonyl, methylcarbonyl, N,N-diethylsulphamoyl, nitro or N,N-diethylcarbamoyl, to give dyestuffs suitable for use in the process of the present invention. The o-toluidine in the above preparation may be replaced by a different arylamine, for example, one of those arylamines mentioned above, to give other suitable dyestuffs.

By the reaction of 1-amino-2-bromo-4-arylaminoanthraquinones with (a) cuprous cyanide, (b) sodium methoxide (c) sodium ethoxide, (d) sodium hydrogen sulphide followed by a methyl halide or (e) sodium hydrogen sulphide followed by an ethyl halide there may be obtained 1-amino-4-arylaminoanthraquinone dyestuffs having in the 2-position a cyano, methoxy, ethoxy, methylmercapto or ethylmercapto group respectively, which dyestuffs are also suitable for use in the process of the present invention.

A typical preparation is carried out as follows (all parts are by weight):

A mixture of 1-amino-2-bromo-4-o-toluidinoanthraquinone (10.0 parts), dimethylformamide (180.0 parts) and cuprous cyanide (10.0 parts) is heated at 150° C. with stirring for 2.5 hours. The mixture is then cooled to room temperature and poured into ice/water (approximately 1000 parts). The precipitate so obtained is filtered off, washed with water and dried.

The dyestuff is obtained by extraction of the dried precipitate with dioxan and dilution of the dioxan extract with an approximately equal volume of isopropanol. The precipitated dyestuff is filtered off, washed and dried. 5.5 Parts of 1-amino-2-cyano-4-o-toluidinoanthraquinone are obtained.

In this Specification all references to placing the transfer material in contact with the textile material means that it is the printed surface of the transfer material which is placed in contact with the textile material.

The heating is carried out at a temperature above 100° C., preferably at a temperature from 160° C. to 220° C.; whilst higher temperatures can in fact be used, and their use would in fact facilitate transfer of the dyestuff, such temperatures are generally detrimental to the textile material resulting in damage to the fibres and/or discolouration thereof. The time during which the heating is carried out is preferably in the range of from 15 seconds to 1 minute, the time and temperature being so adjusted as to obtain maximum transfer of the dyestuff.

The process can be carried out either batchwise or in a continuous manner, using intermittent presses and continuous calendars such as are conventionally employed in the process of transfer color printing. Suitable continuous calendars are those manufactured by inter alia the firms of Harrico-Stibbe, Hunt and Mosscrop, Lemaire and Kannegeisser.

The operation of transfer color printing can be facilitated by carrying it out under reduced pressure, the heating of the transfer material and the synthetic textile material whilst they are in contact being effected in a zone, the pressure of which is less than atmospheric, and has preferably been reduced to a pressure of less than 100 mms. of mercury. This use of reduced pressure for carrying out the process of the present invention forms a preferred feature of the present invention.

Apparatus, both batchwise and continuous, in which the present process can be carried out at reduced pressure is described in our United Kingdom patent specifications Nos. 1,363,852, 1,387,417 and 1,423,358.

As examples of synthetic textile materials which can be used in the process of the invention there may be mentioned cellulose acetate, in particular cellulose triacetate textile materials, polyacrylonitrile textile materials, polyurethane textile materials, polyamide textile materials and especially aromatic polyester textile materials.

Such textile materials can be in the form of webs or woven or knitted goods which can be either in continuous lengths or in the form of made-up garments, such as dresses, or the individual pieces used in the construction of such garments. The term synthetic textile materials also includes goods, such as carpets and other floor coverings, or flocked materials having a pile or tufts or a block surface consisting of synthetic fibres. The process is also applicable to the colouration of films of synthetic materials or to materials such as plywood and asbestos board which have been coated or which carry a layer of a synthetic resin having an affinity for disperse dyestuffs.

If desired the synthetic textile materials can be used in the form of unions with other textile materials with wool or cotton textile materials, but when using such unions in the process it is preferred that the amounts of non-synthetic fibres present are less than 30% by weight of the total weight of the textile material.

If desired, the printed textile materials may be subsequently steamed at normal or elevated pressures to give enhanced penetration of dyestuff into the textile materials.

The transfer materials used in the process of the invention can be obtained by printing a suitable carrier material, which is preferably paper, with one or more inks containing a disperse anthraquinone dyestuff as hereinbefore defined. The said inks can be applied to the carrier material by any of the known methods for applying printing inks, for example gravure, lithographic, flexographic or screen printing methods, using conventional types of printing machinery for this purpose.

The said inks comprise as the essential ingredients thereof one or more disperse anthraquinone dyestuffs as hereinbefore defined, a binder or resin and a liquid medium. The liquid medium can either be water, in which case the dyestuff is present in the form of a finely divided dispersion, or can be an organic liquid, or mixtures thereof, in which case the dyestuff is all in solution (depending on the amount of dyestuff present and its solubility in the particular medium) or partly in solution and partly in the form of a finely divided dispersion.

The said inks can be obtained by mixing together the required ingredients, the mixing preferably incorporating a milling or grinding stage in order to ensure that the dyestuff is in finely divided form.

As examples of organic liquids which can be used to prepare the inks there may be mentioned hydrocarbons such as toluene, xylene and aliphatic petroleum fractions which boil in the range of from 80° C. to 140° C., alcohols such as ethanol and isopropanol, esters such as ethylacetate, and ketones such as methylethyl ketone.

The binders or resins present in the said inks can also act as dispersing agents for the said dyestuffs, but, if desired, additional dispersing agents can be included in the inks. The binders or resins can be of the binders or resins which are conventionally employed in the manufacture of printing inks, and which are described, for example, in the first edition of the Printing Ink Manual which was published in 1961, and in Ink Technology for Printers and Students by E. A. Apps which was published in 1963. In the case of inks based on organic liquids as the media particularly suitable binders are cellulose ethers which are soluble in such liquids such as ethylcellulose, ethylhydroxy ethylcellulose and hydroxypropylcellulose.

The printed synthetic textile materials obtained by the process of the invention can be produced in a wide variety of shades having very good fastness to the tests which are commonly applied to the various textile materials, in particular to light, to wet treatments and to dry heat treatments.

The invention is illustrated but not limited by the following Examples in which the parts and percentages are by weight.

EXAMPLE 1

1 part of 1-amino-2-bromo-4-(2-toluidino)anthraquinone is milled into a solution of 5 parts of a low viscosity grade of ethyl hydroxyethyl cellulose in a mixture of 5 parts of isopropanol and 89 parts of an aliphatic petroleum fraction boiling at 100° to 120° C. The resulting ink is printed on to paper and the printed paper is then dried. The printed paper is placed in contact with a woven polyester textile material and transfer printing is effected by heating the two materials whilst in contact in a transfer printing press for 30 seconds at 210° C. A strong, bright reddish-blue print is obtained which has good fastness to light.

The transfer printing may also be effected in a vacuum transfer printing press for 30 seconds at 210° C. in an applied vacuum of 680 mm/Hg when a strong print is obtained.

EXAMPLES 2 to 60

In place of the 1 part of the dyestuff used in Example 1 there may be used 1 part of a dyestuff having the constitution given in the following table, in which X, Y, $R_1$, $R_2$ and $R_3$ have the meanings given to them in the dyestuff formula as hereinbefore defined. The final column of the table gives the shade of the resulting print on aromatic polyester textile material.

| Ex. | X | Y | $R_1$ | $R_2$ | $R_3$ | Shade |
|---|---|---|---|---|---|---|
| 2 | H | H | $CH_3$ | $CH_3$ | $CH_3$ | Reddish-blue |
| 3 | $C_2H_5$ | H | $OCH_3$ | H | H | " |
| 4 | Br | H | $CH_3$ | H | H | " |
| 5 | Br | H | $CH_3$ | $CH_3$ | H | " |
| 6 | CN | H | $CH_3$ | H | H | Greenish-blue |
| 7 | CN | H | $CH_3$ | $CH_3$ | $CH_3$ | " |
| 8 | Br | H | $CO_2CH_3$ | H | H | Reddish-blue |
| 9 | CHO | H | $OCH_3$ | H | H | Greenish-blue |
| 10 | $COCH_3$ | H | $CH_3$ | $CH_3$ | $CH_3$ | " |
| 11 | $COCH_3$ | H | $CH_3$ | H | H | " |
| 12 | $SO_2CH_3$ | H | $CH_3$ | H | H | Blue |
| 13 | $CH_2Cl$ | H | $CH_3$ | H | H | Reddish-blue |
| 14 | H | H | $CH_3$ | H | H | " |
| 15 | H | H | $CH_3$ | $CH_3$ | H | " |
| 16 | H | H | $OCH_3$ | H | H | " |
| 17 | H | H | $CH_3$ | Cl | H | " |
| 18 | H | H | Cl | H | H | " |
| 19 | H | H | $CO_2CH_3$ | H | H | " |
| 20 | $CH_3$ | H | $CH_3$ | H | H | " |
| 21 | $CH_3$ | H | $CH_3$ | $CH_3$ | H | " |
| 22 | $CH_3$ | H | $CH_3$ | $CH_3$ | $CH_3$ | " |
| 23 | $CH_3$ | H | $OCH_3$ | H | H | " |
| 24 | $CH_3$ | H | $CH_3$ | Cl | H | " |
| 25 | $CH_3$ | H | $CO_2CH_3$ | H | H | " |
| 26 | $C_2H_5$ | H | $CH_3$ | H | H | Reddish-blue |
| 27 | $C_2H_5$ | H | $CH_3$ | $CH_3$ | H | " |
| 28 | $C_2H_5$ | H | $CO_2C_2H_5$ | H | H | " |
| 29 | $OCH_3$ | H | $CH_3$ | H | H | Violet |
| 30 | $OCH_2$ | H | $CO_2CH_3$ | H | H | " |
| 31 | $SCH_3$ | H | $CH_3$ | H | H | Bluish-violet |
| 32 | Br | H | $CH_3$ | $CH_3$ | $CH_3$ | Reddish-blue |
| 33 | Br | H | $OCH_3$ | H | H | " |
| 34 | Br | H | $CH_3$ | Cl | H | " |
| 35 | Br | H | Cl | H | H | " |
| 36 | Br | H | CN | H | H | " |
| 37 | Cl | H | $CH_3$ | H | H | " |
| 38 | Cl | H | $CH_3$ | $CH_3$ | H | " |
| 39 | Cl | H | $CH_3$ | $CH_3$ | $CH_3$ | " |
| 40 | Cl | H | $OCH_3$ | H | H | " |
| 41 | Cl | H | $CH_3$ | Cl | H | Bluish-violet |
| 42 | Cl | H | Cl | H | H | Reddish-blue |
| 43 | Cl | H | $CO_2CH_3$ | H | H | " |
| 44 | Cl | H | CN | H | H | " |
| 45 | CN | H | $CH_3$ | $CH_3$ | H | Greenish-blue |
| 46 | CN | H | $CH_3$ | Cl | H | " |
| 47 | CN | H | $OCH_3$ | H | H | " |
| 48 | CN | H | $CO_2CH_3$ | H | H | " |
| 49 | $NO_2$ | H | $CH_3$ | H | H | Bluish-green |
| 50 | $NO_2$ | H | $OCH_3$ | H | H | " |
| 51 | $SO_2N(C_2H_5)_2$ | H | $CH_3$ | H | H | Blue |
| 52 | $SO_2N(C_2H_2)_2$ | H | $OCH_3$ | H | H | " |
| 53 | $CO_2CH_3$ | H | $CH_3$ | H | H | Greenish-blue |
| 54 | $CO_2CH_3$ | H | $OCH_3$ | H | H | " |
| 55 | $CO_2C_2H_5$ | H | $CH_3$ | H | H | " |
| 56 | $CON(C_2H_5)_2$ | H | $CH_3$ | H | H | " |
| 57 | $OC_2H_5$ | H | $CH_3$ | H | H | Violet |
| 58 | $SC_2H_5$ | H | $CH_3$ | H | H | Bluish-violet |
| 59 | CHO | H | $CH_3$ | H | H | Blue |
| 60 | $SO_2C_2H_5$ | H | $CH_3$ | H | H | Greenish-blue |

We claim:
1. A process for the transfer color printing of synthetic textile materials which comprises placing a transfer material which carries a colored pattern, derived from one or more disperse anthraquinone dyestuffs, in contact with a synthetic textile material and heating the transfer material and the synthetic textile material whilst in contact so as to transfer the dyestuff from the transfer material to the synthetic textile material, the disperse anthraquinone dyestuff or dyestuffs being of the formula:

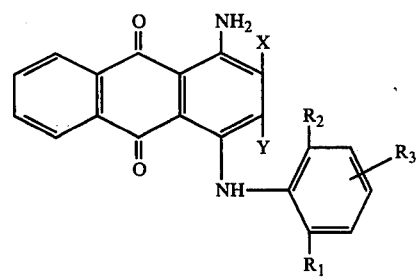

wherein
X and Y are each independently hydrogen, optionally substituted lower alkyl, lower alkoxy, lower alkylmercapto or an electron-withdrawing group;
$R_1$ is optionally-substituted lower alkyl, lower alkoxy, lower alkoxycarbonyl, halogen, nitrile or acyloxy and
$R_2$ and $R_3$ are each independently hydrogen, optionally substituted lower alkyl, lower alkoxy, lower alkoxycarbonyl, halogen, nitrile or acyloxy.

2. A process as claimed in claim 1 wherein at least one of X and Y is an electron withdrawing group.

3. A process as claimed in claim 2 wherein X is an electron-withdrawing group.

4. A process as claimed in claim 1 wherein the heating is carried out at a temperature from 160°–220° C.

5. A process as claimed in claim 1 wherein the heating of the transfer material and the synthetic textile material whilst they are in contact is effected in a zone the pressure of which is less than atmospheric pressure.

6. A process as claimed in claim 5 wherein the pressure in the zone is less than 100 mm of mercury.

7. A process as claimed in claim 1 wherein the synthetic textile material is an aromatic polyester textile material.

8. A synthetic textile material whenever colored by a process as claimed in claim 1.

* * * * *